(12) United States Patent
Hayes et al.

(10) Patent No.: US 9,424,768 B2
(45) Date of Patent: Aug. 23, 2016

(54) SYSTEM AND METHOD FOR UNIVERSAL 3D VIEWING DEVICE

(75) Inventors: Patrick H. Hayes, Mission Viejo, CA (US); Jeremy K. Black, N. Tustin, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 1895 days.

(21) Appl. No.: 12/724,820

(22) Filed: Mar. 16, 2010

(65) Prior Publication Data

US 2011/0227909 A1 Sep. 22, 2011

(51) Int. Cl.
*H04N 7/12* (2006.01)
*H04N 13/02* (2006.01)
*H04N 11/04* (2006.01)
*G09G 3/20* (2006.01)
*H04N 13/04* (2006.01)

(52) U.S. Cl.
CPC ............ *G09G 3/20* (2013.01); *H04N 13/0438* (2013.01); *H04N 2213/008* (2013.01)

(58) Field of Classification Search
USPC .................................................. 348/41–62
See application file for complete search history.

(56) References Cited

U.S. PATENT DOCUMENTS

| | | | |
|---|---|---|---|
| 6,057,811 A | 5/2000 | Edwards | |
| 6,476,850 B1 | 11/2002 | Erbey | |
| 2004/0178969 A1 | 9/2004 | Zhang et al. | |
| 2007/0139769 A1* | 6/2007 | DeCusatis et al. | 359/478 |
| 2007/0153122 A1 | 7/2007 | Ayite et al. | |
| 2007/0261023 A1* | 11/2007 | Choo et al. | 717/106 |
| 2008/0043203 A1* | 2/2008 | Jacobs et al. | 352/63 |
| 2009/0051759 A1* | 2/2009 | Adkins et al. | 348/53 |
| 2010/0007582 A1* | 1/2010 | Zalewski | 345/8 |
| 2011/0228046 A1* | 9/2011 | Arling et al. | 348/42 |
| 2011/0285699 A1* | 11/2011 | Bittner et al. | 345/419 |
| 2012/0062562 A1 | 3/2012 | Chen et al. | |

FOREIGN PATENT DOCUMENTS

| | | |
|---|---|---|
| EP | 2442580 A2 | 4/2012 |
| WO | 97/43681 A1 | 11/1997 |

OTHER PUBLICATIONS

The International Bureau of WIPO, International Preliminary Report on Patentability of PCT application No. US2011/026030, date of issuance of report Sep. 18, 2012, 7 pgs.
European Patent Office, extended European Search Report issued on European patent application No. 11756891.5 received on Jul. 24, 2013, 7 pages.
European Patent Office, extended European Search Report issued on European patent application No. 11756707.3 dated Aug. 27, 2013, 6 pages.
European Patent Office, Examination Report issued on European patent application No. 11756891.5, dated Jun. 3, 2015, 4 pages.

\* cited by examiner

*Primary Examiner* — Frederick Bailey
*Assistant Examiner* — Talha M Nawaz
(74) *Attorney, Agent, or Firm* — Greenberg Traurig, LLP

(57) ABSTRACT

A signal format definition data appropriate for a rendering device used to present alternate-frame sequencing based 3D material is identified and the identified signal format definition data is thereafter used to decode received synchronization signals associated with the rendering device. A shutter of a universal viewing device may thus be controlled as a function of the decoded synchronization signals associated with the rendering device to thereby allow for viewing of the alternate-frame sequencing based 3D material.

1 Claim, 3 Drawing Sheets

SYSTEM AND METHOD FOR UNIVERSAL 3D VIEWING DEVICE

BACKGROUND

Various 3D television content and rendering devices are presently starting to enter the consumer electronics market. Several technologies are available which produce viewer sensation of a 3D image, including anaglyphic based 3D utilizing glasses with two different color lenses (for example red and cyan); polarization based 3D utilizing glasses with lenses polarized in different directions (for example horizontal and vertical polarization); and alternate-frame sequencing based 3D utilizing glasses or headgear equipped with active-shutters which operate in synchronization with alternating picture frames. Autostereoscopic based displays which do not require any glasses or headgear (for example producing a 3D effect through the use of a Lenticular lens in the display device) have also been proposed, although at the current state of technology development these are generally effective only over a limited number of "sweet spot" viewer positions.

Of the current technologies, many manufacturers of 3D TV rendering devices are opting for the alternate-frame sequencing based 3D technology that utilizes active-shutter glasses. The shutter mechanism of the glasses may be electronic, for example using a transmissive LCD material, or may be mechanical. Shutter synchronization with the frames displayed by a 3D TV rendering device may be accomplished through a wired connection or wirelessly via an infrared or RF signal transmitted by the rendering device, playback device, or an external adapter supplied in conjunction with the active-shutter glasses; with the wireless signal generally preferred for user convenience.

In current implementations of the alternate-frame sequencing based 3D approach, many equipment manufacturers have developed proprietary signaling schemes, shutter timings, frame rates, and/or data formats for the synchronization signal transmitted to the active-shutter glasses (collectively referred to hereinafter as "signal format"). Accordingly, active-shutter glasses supplied with alternate-frame sequencing based 3D equipment of one manufacturer may not be compatible with, i.e., usable with, alternate-frame sequencing based 3D equipment of other manufactures. Because functional active-shutter glasses are a prerequisite for viewing alternate-frame sequencing based 3D content and because active-shutter glasses may be a relatively expensive accessory required for every individual viewer, this lack of compatibility may be perceived by consumers as a drawback.

SUMMARY OF THE INVENTION

This invention relates generally to 3D viewing systems and, more particularly, to an active viewing device intended to be interposed between a viewer and plural different display rendering devices that provides a means for universally synchronizing the active viewing device with alternate-frame sequencing based 3D encoded material presented on each of the plural different display rendering devices. To this end, the active viewing device, e.g., a pair of universal active-shutter 3D viewing glasses, includes a microcontroller programmed to receive and decode the wireless shutter synchronization signals of multiple manufacturers to thereby enable use of the active viewing device with multiple, different displaying rendering devices presenting alternate-frame sequencing based 3D content. The signal format currently in use in conjunction with a display rendering device may be automatically detected by the programming of the microcontroller of the active viewing device, may be selected by the user via an input means associated with the active viewing device (such as, for example, a miniature rotary switch), may be externally selected on a PC or set top box and downloaded or transmitted to the active viewing device, etc., as appropriate for a particular embodiment. Additionally, in some embodiments, the active viewing device may incorporate convenience features such as remote control functionality, earphones, etc.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
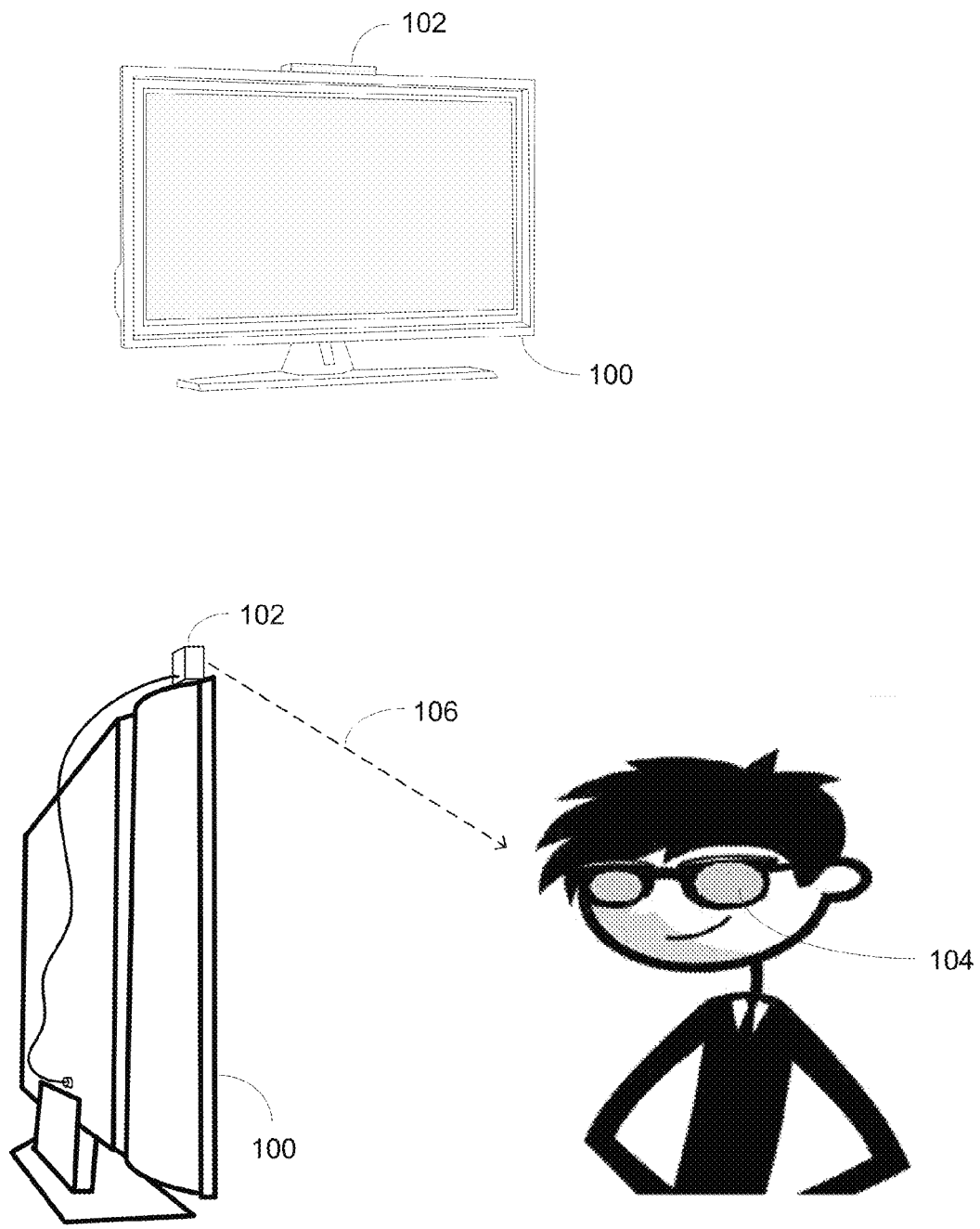
FIG. 1 illustrates an exemplary system equipped for 3D viewing.

With reference to FIG. 1, an exemplary TV set 100 suitable for rendering alternate-frame sequencing based 3D material may include a transmitter 102 for the propagation of synchronization signals 106 to active viewing devices such as exemplary active-shutter glasses 104. It will be appreciated that the source of the synchronization timing information to be conveyed to active-shutter glasses 104 may be TV set 100 or may be some other unit such as a set top box, DVD player, etc., and that wireless transmitter 102 may comprise a separate external unit as illustrated or may be incorporated into TV set 100 or other source unit, as appropriate for a particular embodiment. The synchronization signals may be transmitted using IR, RF, ultrasonic, or any other convenient means and may use any signal format recognizable by exemplary glasses 104.

Figure 2:
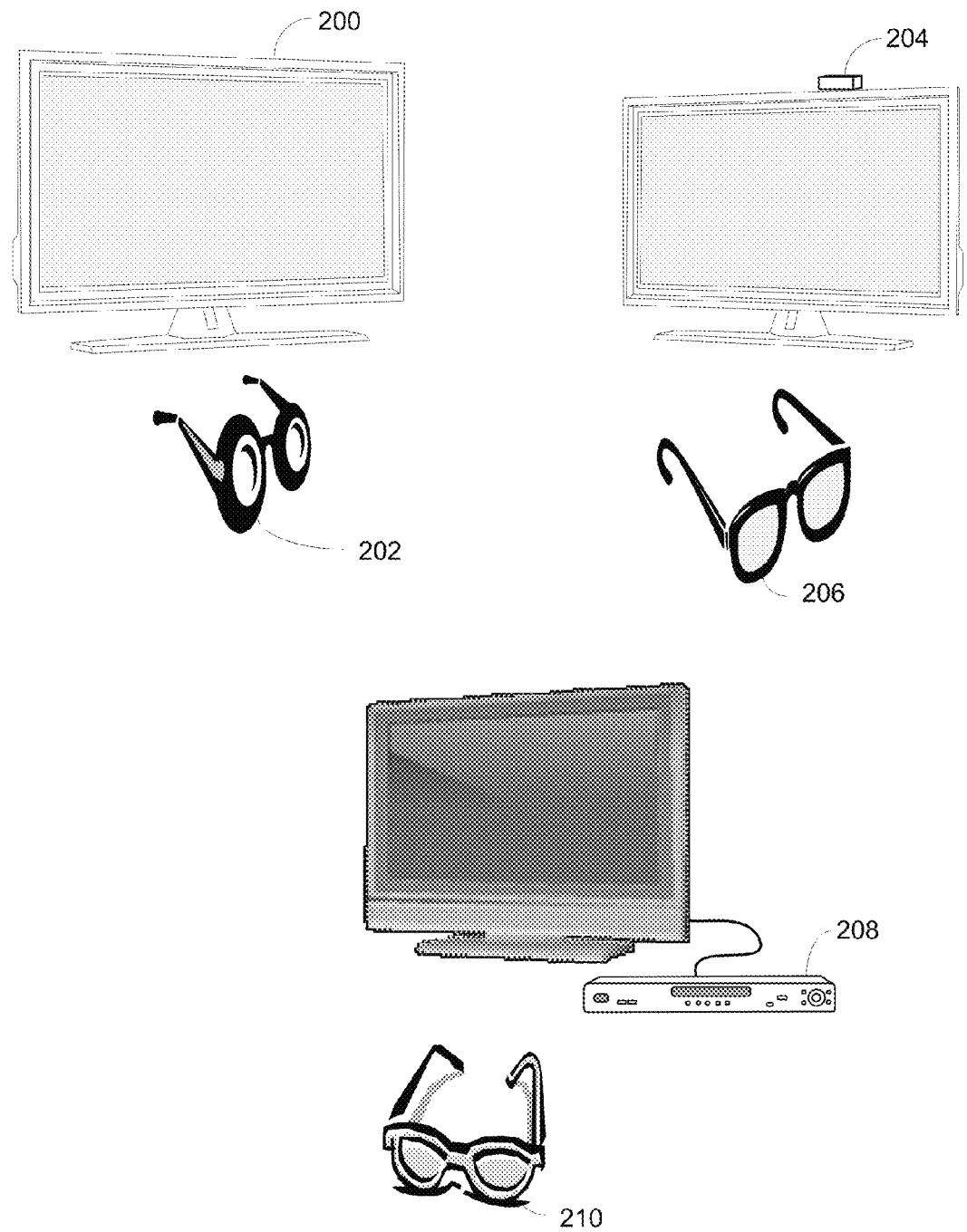
FIG. 2 illustrates various prior art items of 3D viewing apparatus.

Turning now to FIG. 2, in accordance with current art, manufacturer 200 may supply active viewing device 202 that is only compatible with, i.e., only recognizes, manufacturer 200's signal format; manufacturer 204 may supply active viewing device 206 that is only compatible with, i.e., only recognizes, manufacturer 204's signal format; manufacturer 206 may supply active viewing device 208 that is only compatible with, i.e., only recognizes, manufacturer 206's signal format; and so on. Such active viewing device incompatibility between rendering devices of different manufacture may constitute a disincentive to consumer satisfaction with and/or adoption of the technology.

Figure 3:
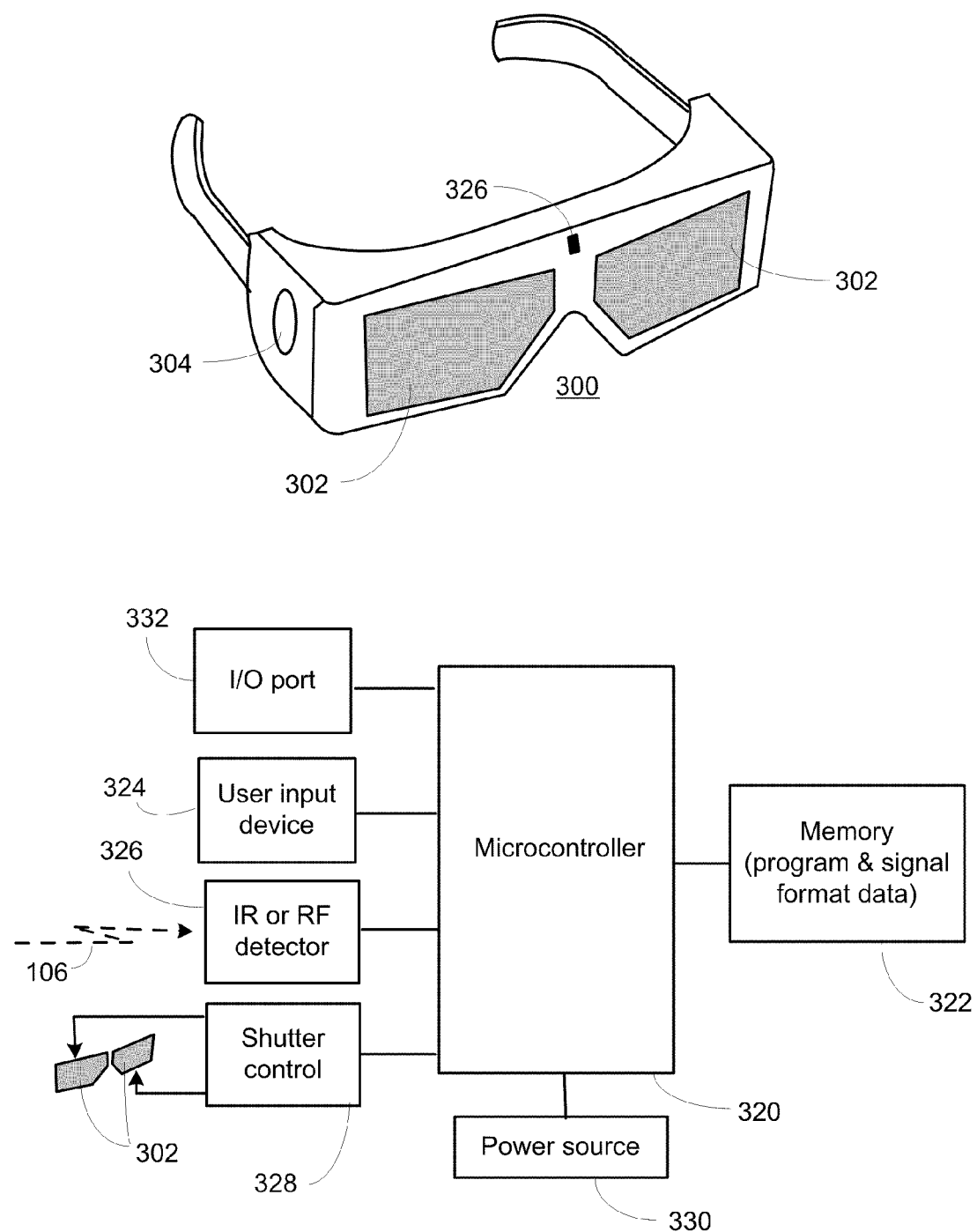
FIG. 3 illustrates an exemplary universal active-shutter 3D viewing apparatus in accordance with this invention.

FIG. 3 illustrates an exemplary universal, active viewing device 300 in accordance with the instant invention. Exemplary universal, active viewing device 300 is in the form of active-shutter glasses 300 which may incorporate a pair of LCD-based active-shutter lenses 302 together with associated control circuitry 328 coupled to an on-board microcontroller 320. Microcontroller 320 may also be coupled to or incorporate a memory 322 which may comprise RAM, ROM, FLASH or any combination thereof; user input means 324, which may comprise a miniature key matrix, miniature rotary switch, DIP switch, pushbutton, etc. as appropriate; receiver and/or transceiver circuit(s) 326 (e.g., IR and/or RF); an input/output port 332 such as a serial interface, USB port, modem, Zigbee, WiFi, or Bluetooth transceiver, etc.; and a power source 330 which may also power peripheral circuitry such as the active-shutter control 328, an IR or RF receiver 326, etc. All or some of these components may be utilized within the active viewing device 300 as needed.

As will be understood by those skilled in the art, portions of the memory 322 may include instructions that are intended to be executed by the processor 300 to control the operation of the active viewing device 300 (hereafter the operational software), as well as data which serves to define to the operational software the necessary signal formats for use in decoding synchronization signals received from a signal transmitter 102 (hereinafter the "signal format definition data"). In this manner, the processor 320 may be programmed to control the various electronic components within the universal viewing device 300, e.g., to monitor receiver 326, to decode synchronization signals received from a signal transmitter 102 and for providing the decoded synchronization signals to active-shutter control circuit 328, to monitor the user interface device 324 as appropriate to receive user set up commands or other input, etc.

Selection by the operational software of the signal format definition data to be used in decoding synchronization signals received from a transmitter 102 may be automatic, for example, by analyzing the characteristics of a received synchronization signal and comparing these to various items of signal format definition data stored in memory 322 to thereby select a matching signal format definition data for use in the aforementioned decoding process. Such characteristics may comprise, without limitation, carrier and/or modulation frequency, pulse width or timing, data encoding, packet size, repetition rate, etc. Alternatively, the received synchronization signal may contain data that otherwise explicitly informs the universal viewing device 300 of a signal format definition data to be used in the aforementioned decoding process. Such data may be provided to the universal viewing device 300 in the form of a separate initialization transmission; a header, preamble, or trailer affixed to each transmission, etc. Such explicit identification data may be an integral part of the synchronization signal or may be added to the synchronization signal, appended to the synchronization signal, or be separately issued by an externally provisioned or add-on transmitter unit.

In embodiments where automatic identification of a signal format is not possible or not desirable, user-initiated configuration of the universal viewing device 300 may be provided, for example by entering configuration settings using a user input device 324, located for example inside a battery compartment 304 of the universal viewing device 300. In this regard, the configuration settings to be entered via the user input device 324, e.g., dip switch arrangements, dial settings, etc, may be provided to a user in a user's manual that includes various configuration settings cross-referenced to various device manufacturers. Alternatively, a setup application may be provided for execution on an external device, for example, a PC, set top box or other appliance, etc., which application allows a user to enter or select from a menu information, e.g., manufacturer of TV 102, which serves to identify the signal format definition data to be used. Once identified, the identity of the signal format definition data to be used may be conveyed to universal viewing device 300 via IR or RF receiver 326 using either the standard synchronization signal transmitter 102 or a separate transmitter provided for use with the setup application; via a separate I/O port 332; via a USB transfer device, or any other convenient means. In embodiments of universal viewing device 300 which include a rechargeable battery and docking station, it will be appreciated that a connection to I/O port 332 may be built into such docking station for transferring information used to configure the universal viewing device 300 for compatible operation with a synchronization signal. It will also be appreciated that, rather than identify a signal format definition data within a library of signal format definition data stored in memory to be used, the system may provide for the conveyance of a signal format definition data itself to the universal viewing device 300 for use in the aforementioned decoding process. Alternative universal viewing device 300 setup procedures are also contemplated, for example scanning a bar code or reading an RFID tag associated with a rendering device.

Regardless of the configuration process used, in some embodiments an I/O port 330 may be provided for the purpose of updating the library of signal format definition data stored in memory 322, for example, when a new rendering device using a heretofore unknown synchronization signal format enters the market.

In certain embodiments, the universal viewing device 300 may include additional user convenience features. For example, the universal viewing device 300 may include a library of infrared and/or RF appliance control codes and/or data may be included in the contents of memory 322 together with the appropriate IR and/or RF transmitter or transceiver means (not illustrated) and one or more user inputs such as keys, buttons, or sensors coupled to microcontroller 320. As is well known in the art (see, for example, U.S. Pat. Nos. 4,959, 810 and 5,872,563, which patents are incorporated herein by reference in their entirety), such a library of codes and/or data may be used to command operational functions of various appliances. The selection of a particular IR or RF code set to be used may be inferred based upon the selected synchronization signal format, or may be separately configured using any of the methods previously presented. The IR and/or RF codes and/or data may also be upgraded or updated via I/O port 330 as described for signal format definition data, or may be upgraded or updated via the IR and/or RF transceiver means for the purpose of updating the library of infrared and/or RF appliance control codes and/or data stored in memory 322, for example, when a new appliance is introduced into the users entertainment setup. This IR/RF transmitter subsystem may provide basic appliance control functionality, e.g. volume or play/pause control to every wearer of a universal viewing device 300 so equipped. Other functionality offered may include automatic actions such as, for example, automatically pausing content playback, automatically causing the rendering device to switch to a 2D presentation mode, etc. when universal viewing device 300 is removed from a viewer's face (which removal may be sensed using any form of proximity sensor provided to the universal viewing device 300).

In other embodiments, a wearable 3D viewing apparatus such as a headset or glasses may include earphones configured to receive an audio stream encoded either as part of the synchronization signal data, or as separate transmission. In this manner individual viewers may adjust volume levels to personal preference, listen to different language tracks, etc.

While various concepts have been described in detail, it will be appreciated by those skilled in the art that various modifications and alternatives to those concepts could be developed in light of the overall teachings of the disclosure. For example, while the illustrative example comprises the recognition and decoding of differing synchronization signal streams within a wearable portion of a universal viewing device, it will be appreciated that in other embodiments all or part of this processing may be performed within a separate device prior to transmission, i.e., in a universal version of adapter 102.

For example, it is contemplated that a device may be provided that functions to recognize various different forms of synchronization signals and which functions to convert received synchronization signals to a single generic synchronization signal that it to be used by a universal viewing device 300. It will be further appreciated that the methods herein, though illustrated in the context of a wireless synchronization signal, are equally applicable to a wired system.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A method for controlling a shutter of a universal viewing device used to view alternate-frame sequencing based 3D material presented on a rendering device, comprising:
   selecting from a library of signal format definition data a signal format definition data for use by an intermediate device in decoding received signals wherein the received signals comprise encoded synchronization data appropriate for the rendering device;
   using the signal format definition data selected from the library of signal format definition data by the intermediate device to decode the encoded synchronization data in the received signals and
   causing the intermediate device to control the shutter of the universal viewing device as a function of the encoded synchronization data in the received signals as decoded by use of the signal format definition data selected from the library of signal format definition data to thereby allow the universal viewing device to be used to view alternate-frame sequencing based 3D material presented on the rendering device.

* * * * *